(12) United States Patent
Chen

(10) Patent No.: US 7,134,534 B2
(45) Date of Patent: Nov. 14, 2006

(54) DAMPER FOR FRONT FORK OF VEHICLE

(75) Inventor: Hui-Hsiung Chen, Taichung (TW)

(73) Assignee: Spinner Industry Co., Ltd. (TW)

( * ) Notice: Subject to any disclaimer, the term of this patent is extended or adjusted under 35 U.S.C. 154(b) by 0 days.

(21) Appl. No.: 10/793,921

(22) Filed: Mar. 8, 2004

(65) Prior Publication Data

US 2005/0121271 A1   Jun. 9, 2005

(30) Foreign Application Priority Data

Dec. 4, 2003   (TW)   ................. 92221386 U

(51) Int. Cl.
*F16F 9/34*   (2006.01)
*F16K 17/26*   (2006.01)

(52) U.S. Cl. ............ 188/322.13; 188/316; 188/322.22; 137/493.7; 280/276

(58) Field of Classification Search ............ 188/266.1, 188/281, 282.1, 282.7, 282.8, 284, 285, 286, 188/297, 313, 316–318, 322.13, 322.14, 188/322.15, 322.22; 137/493.7, 493.8; 280/276, 280/279

See application file for complete search history.

(56) References Cited

U.S. PATENT DOCUMENTS

| | | | | |
|---|---|---|---|---|
| 2,570,362 A | * | 10/1951 | Mercier | ................... 188/282.7 |
| 3,912,054 A | * | 10/1975 | Fabre et al. | ............. 188/282.1 |
| 4,057,264 A | * | 11/1977 | Suzuki et al. | ............... 280/276 |
| 4,325,468 A | * | 4/1982 | Siorek | ...................... 188/282.8 |
| 4,823,922 A | * | 4/1989 | Ergun | ...................... 188/282.8 |
| 4,850,461 A | * | 7/1989 | Rubel | ...................... 188/282.1 |
| 4,971,344 A | * | 11/1990 | Turner | ........................ 280/276 |
| 5,094,324 A | * | 3/1992 | Tsai | ........................... 188/269 |
| 6,102,170 A | * | 8/2000 | de Molina et al. | .......... 188/275 |
| 6,499,572 B1 | * | 12/2002 | Masamura et al. | ...... 188/282.1 |
| 6,592,136 B1 | * | 7/2003 | Becker et al. | .............. 280/276 |

* cited by examiner

*Primary Examiner*—Melody M. Burch
(74) *Attorney, Agent, or Firm*—Bacon & Thomas PLLC

(57) ABSTRACT

A front fork for a vehicle includes an upper front fork tube, a lower front fork tube movably coupled to the upper front fork tube, a fluid contained in the upper and lower front fork tubes, and a damper fixedly sealedly mounted inside the upper front fork tube. The damper has a fluid inlet, a fluid outlet, a through hole in communication with the fluid inlet, and a blocking member movably mounted in the fluid inlet for regulating upward flowing rate of the fluid from the lower front fork tube into the upper front fork tube through the fluid inlet and the through hole upon movement of the upper front fork tube relative to the lower front fork tube.

1 Claim, 8 Drawing Sheets

DAMPER FOR FRONT FORK OF VEHICLE

BACKGROUND OF THE INVENTION

1. Field of the Invention

The present invention relates generally to a vehicle such as a bicycle, motorcycle, etc., and, more specifically, to a damper for use in a front fork of the vehicle.

2. Description of the Related Art

FIG. 1 shows a conventional hydraulic shock-absorbing design of bicycle front fork 1. According to this design, the bicycle front fork 1 comprises an upper front fork tube 2, a lower front fork tube 3, and a hydraulic buffer 4 mounted in the upper and lower front fork tubes 2 and 3. The hydraulic buffer 4 comprises an adjustment rod 4a, a piston rod 4b, and damping devices (including oil seals, bearings, rubber rings, spring plates, piston and etc.) 4c forming a fluid loop. The adjustment rod 4a and the piston rod 4b have the respective bottom end extended to the bottom side of the lower front fork tube 3, and the respective top end inserted into the inside of the upper front fork tube 2. The damping devices 4c are fastened to the top end of the piston rod 4b in proper order. During relative motion between the upper front fork tube 2 and the lower front fork tube 3, hydraulic fluid flows in the aforesaid fluid loop, producing a damping effect. Further, the aforesaid adjustment rod 4a is adapted to control the open width of the fluid loop, thereby setting the damping resistance value.

The aforesaid front fork 1 provides a buffering effect; however, the complicated structure of the damping devices 4c greatly increases the manufacturing cost of the front fork 1 and complicates its installation procedure. In order to support the damping devices 4c, the adjustment rod 4a and the piston rod 4b are made having an extended length (see FIG. 1). Increasing the length of the adjustment rod 4a and the piston rod 4b relatively increases the cost.

FIG. 2 shows another design of bicycle front fork 5 according to the prior art. According to this design, the bicycle front fork 5 comprises an upper front fork tube 6, a lower front fork tube 7, a valve bonnet 8 fastened to the bottom end of the upper front fork tube 6, the valve bonnet 8 having a center inlet 8a, two outlets 8b spaced from the inlet 8a at two sides, and two flaps 8c respectively fastened to the bottom wall of the valve bonnet 8 and adapted to close the outlets 8b, a needle valve 9 inserted from the top of the upper front fork tube 6 and approaching the top end of the inlet 8a of the valve bonnet 8, the needle valve 9 having a rear (top) end 9b extended to the outside of the bicycle front fork 5 for receiving an external driving force that is employed to the needle valve 9 to control the distance between the front end 9a of the needle valve 9 and the top end of the inlet 8a of the valve bonnet 8 and to further adjust the damping resistance. The structure of this design of bicycle front fork 5 is relatively simplified; however the needle valve 9 is not durable in use because it directly receives impact pressure from upward flowing of hydraulic fluid passing through the inlet 8a during relative motion between the upper front fork tube 6 and the lower front fork tube 7.

Therefore, it is desirable to provide a front fork having a damper for a vehicle, which can eliminate the drawbacks of the aforesaid prior art designs.

SUMMARY OF THE INVENTION

It is the main object of the present invention to provide a front fork having a damper for a vehicle, which is easy to install and inexpensive to manufacture.

It is another object of the present invention to provide a front fork having a damper for a vehicle, which uses a vertically movable spacer member to match with a through hole for gradually regulating the flow rate of upward flowing of hydraulic fluid upon relative emotion between the upper front fork tube and the lower front fork tube.

To achieve these objects of the present invention, the front fork for a vehicle comprises an upper front fork tube, a lower front fork tube axially movably coupled to the upper front fork tube, a fluid contained in the upper and lower front fork tubes, and a damper sealedly mounted inside the upper front tube. The damper includes a cylindrical main body fixedly fastened to a bottom side inside the upper front fork tube, a blocking member, and a spring member. The main body has a fluid inlet and a fluid outlet axially extended therethrough, and a through hole in communication between the fluid inlet and an outside of the cylindrical main body. The blocking member is mounted in the fluid inlet of the cylindrical main body and movable between a first position where the blocking member stops the fluid from flowing upwards through the fluid inlet to above the cylindrical main body, and a second position where the fluid is allowed to pass from below the cylindrical main body to above the cylindrical main body through the through hole and the fluid inlet. The spring member is mounted in the fluid inlet for holding the blocking member in the first position. During reciprocating motion of the upper front fork tube relative to the lower front fork tube, the blocking member is moved from the first position toward the second position for enabling the fluid to flow upwards through the damper, and then returned to the first position to prohibit upward flowing of the fluid through the fluid inlet and for enabling the fluid to flow downwards through the fluid outlet.

DETAILED DESCRIPTION OF THE INVENTION

Figure 1:
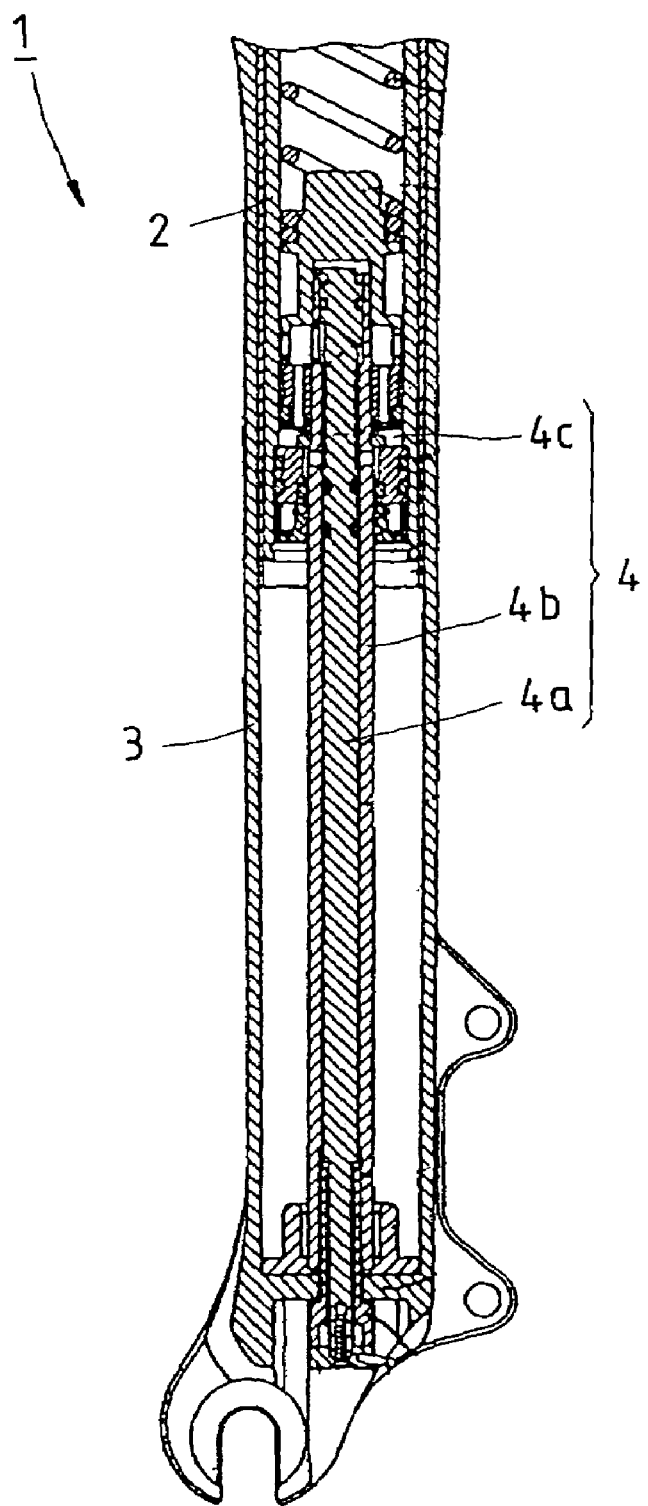
FIG. 1 is a sectional view of a bicycle front fork constructed according to the prior art.
Figure 2:
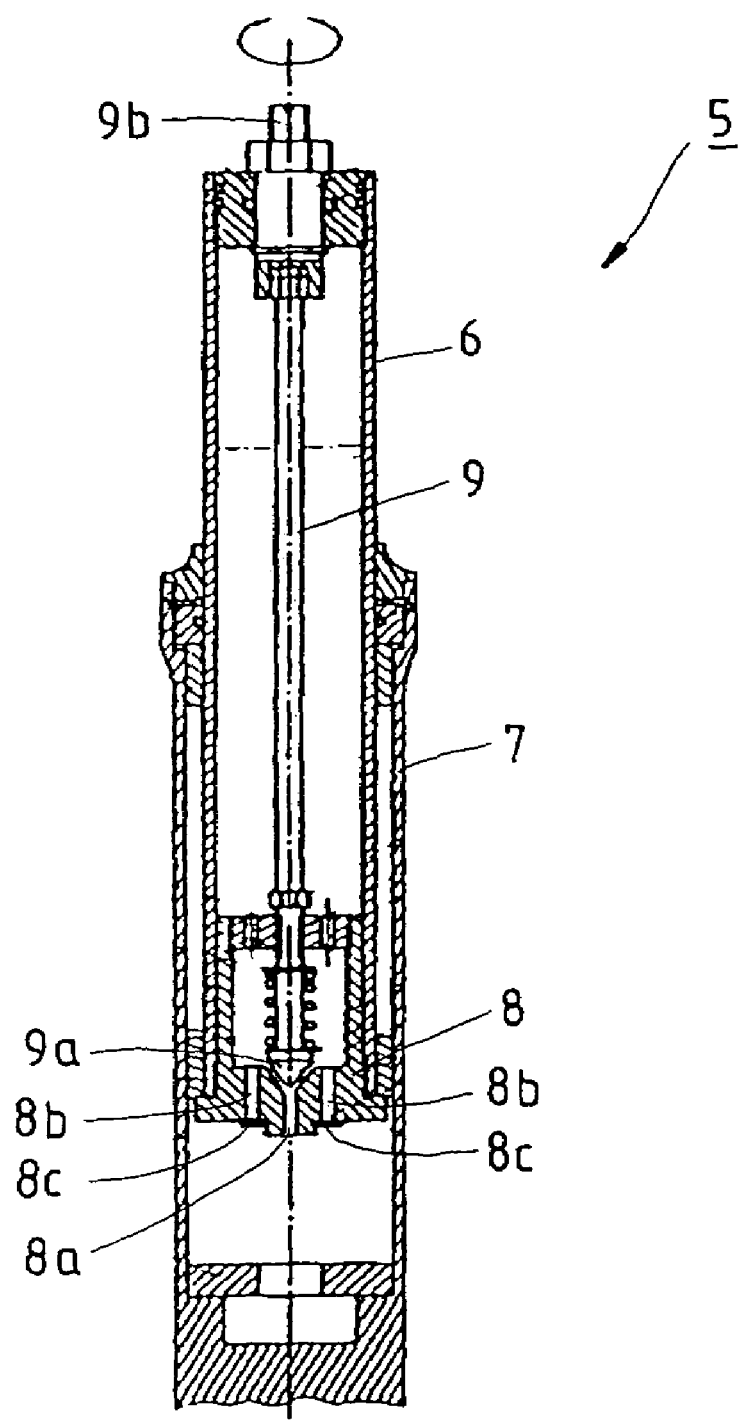
FIG. 2 is a sectional view of another design of bicycle front fork according to the prior art.
Figure 3:
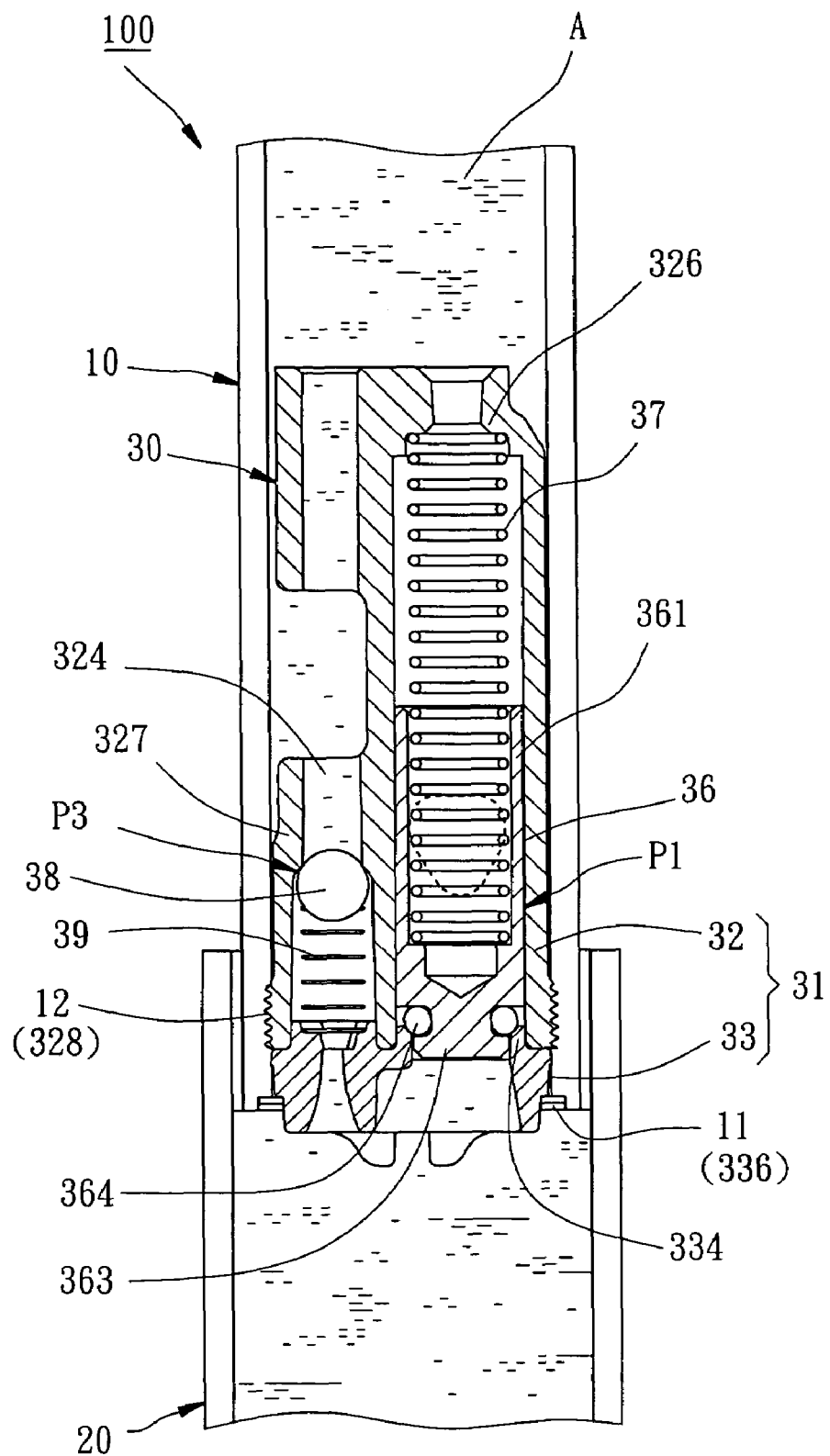
FIG. 3 is a sectional view of the present invention where the upper and lower front fork tubes are maintained immovable relative to each other.
Figure 4:
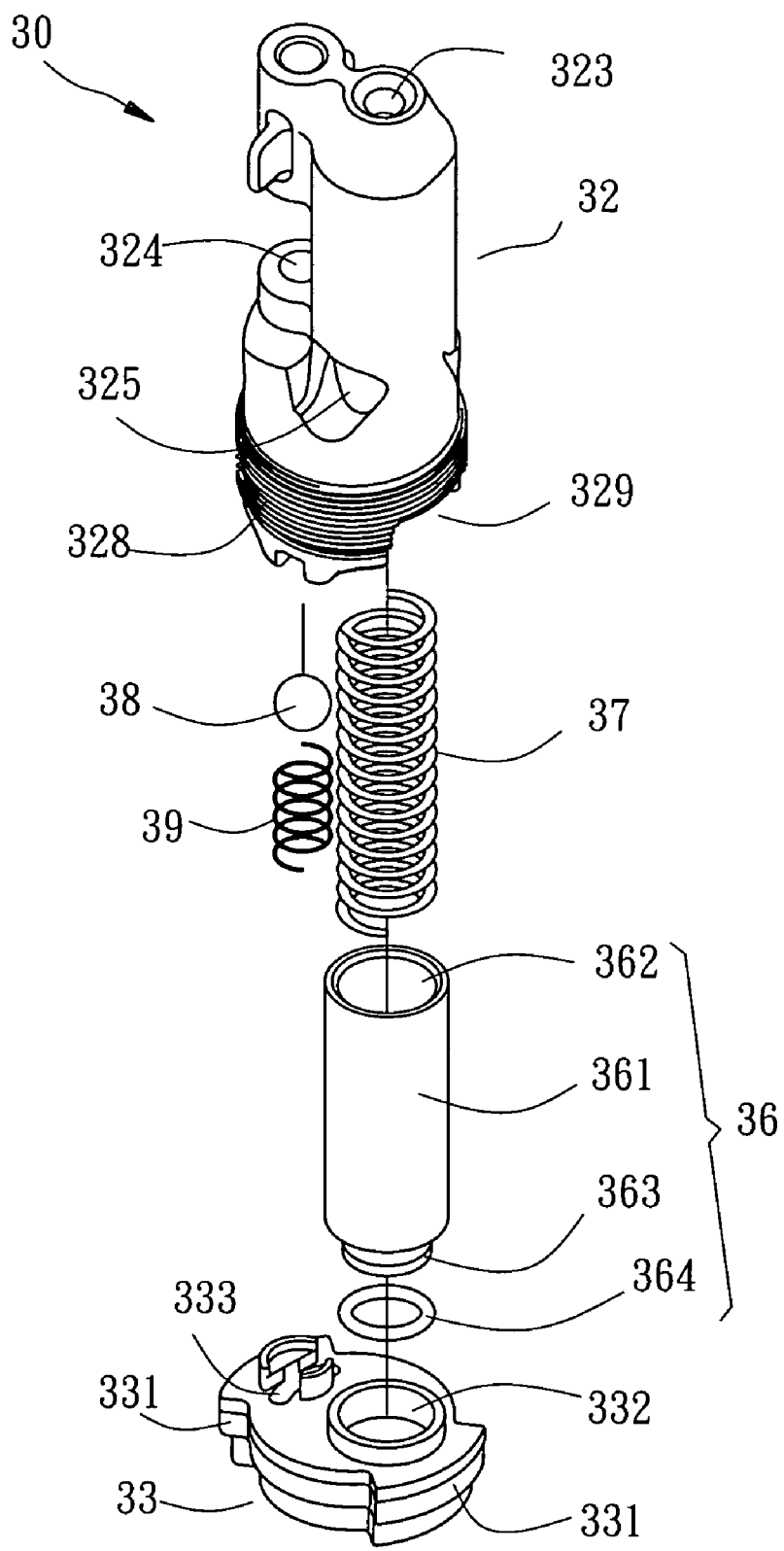
FIG. 4 is an exploded view of the damper according to the present invention.
Figure 5:
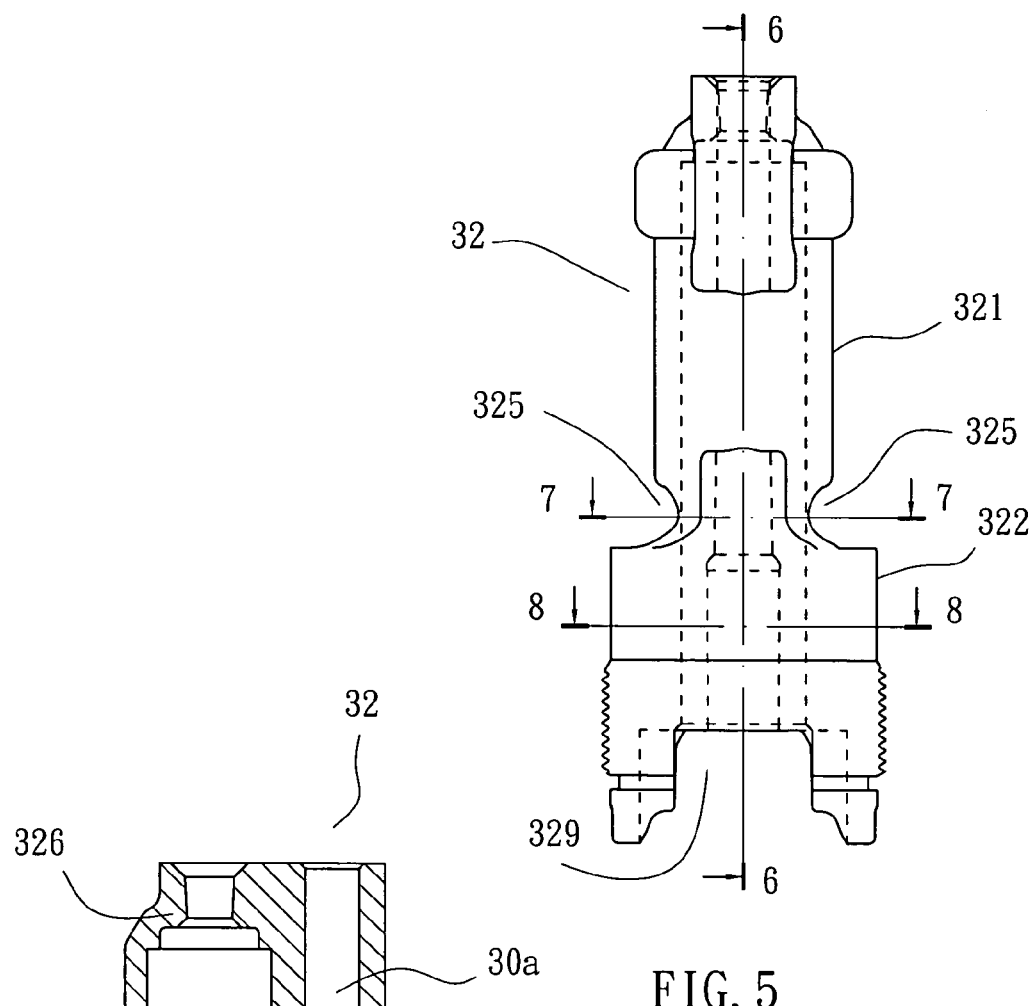
FIG. 5 is a front view of the main body of the damper according to the present invention.
Figure 6:
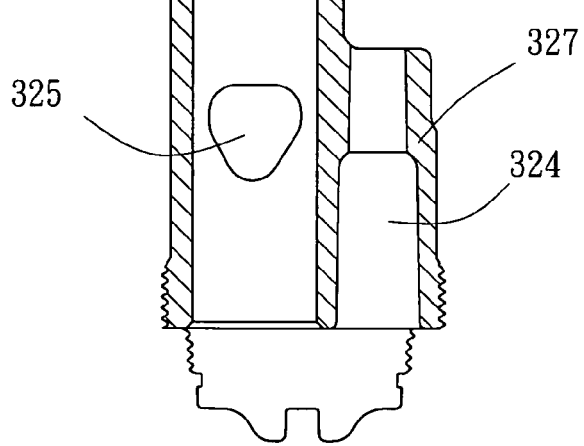
FIG. 6 is a sectional view taken along line 6—6 of FIG. 5.
Figure 8:
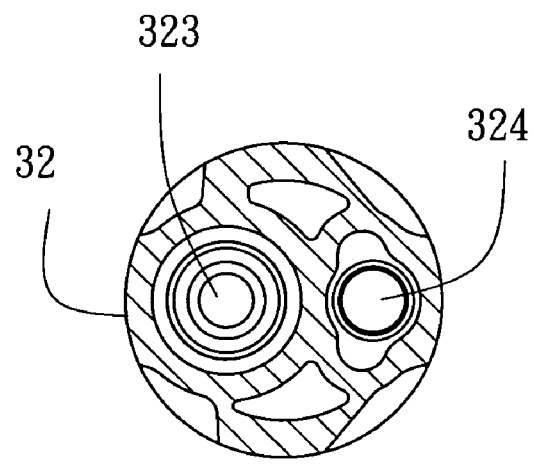
FIG. 8 is a sectional view taken along line 8—8 of FIG. 5.
Figure 7:
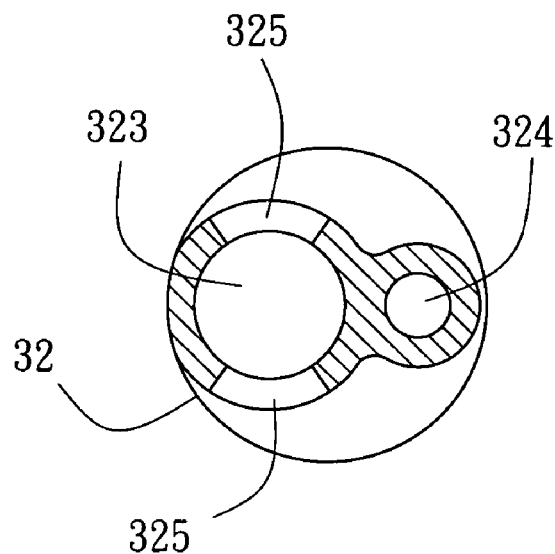
FIG. 7 is a sectional view taken along line 7—7 of FIG. 5.

Referring to FIGS. 3 and 4, a front fork 100 for a bicycle is shown comprising an upper front fork tube 10, a lower front fork tube 20 axially movably coupled to the upper front fork tube 10. The outer diameter of the upper front fork tube 10 is smaller than the inner diameter of the lower front fork tube 20. The upper front fork tube 10 has an inside annular groove 11 extended around the inside wall at the bottom side, and an inner thread 12 extended around the inside wall above the inside annular groove 11. A fluid A is contained in the front fork tubes 10 and 20. A damper 30 is fastened to the inside of the upper front fork tube 10 near the bottom and is immersed in the fluid A.

The damper 30 is comprised of a cylindrical main body 31, a blocking member 36, a first spring member, i.e. a coil spring 37, a sealing member, i.e. a ball 38 as shown in FIGS. 3–4, and a second spring member, i.e. a coil spring 39. The cylindrical main body 31 is comprised of a cylindrical casing 32 and a bottom block 33 fastened to a bottom side of the cylindrical casing 32.

As shown in FIGS. 5–8, the cylindrical casing 32 comprises a narrow upper part 321, a broad lower part 322, a first axial hole 323 axially extended through the narrow upper part 321 and the broad lower part 322, a second axial hole 324 axially extended through the broad lower part 322, a first shoulder 326 formed in the narrow upper part 321 around the top end of the first axial hole 323, a second shoulder 327 formed in the broad lower part 322 around the top end of the second axial hole 324, two through holes 325 transversely extended across the connection area between the narrow upper part 321 and the broad lower part 322 in communication between the first axial hole 323 and the outside of the cylindrical casing 32, an outer thread 328 extended around the periphery of the broad lower part 322 and threaded into the inner thread 12 of the upper front fork tube 12.

Figure 9:
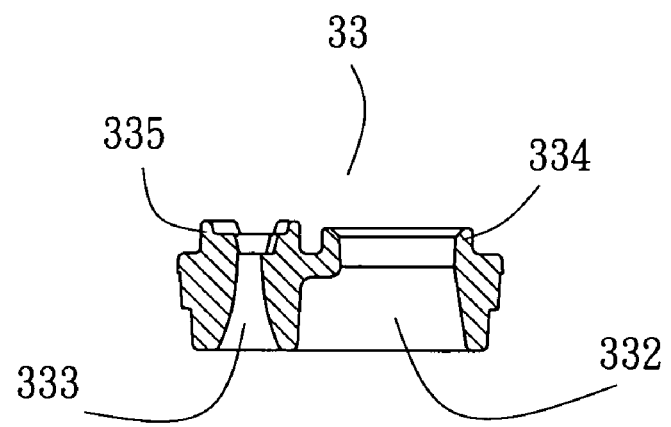
FIG. 9 is a sectional view of the bottom block of the damper according to the present invention.
Figure 10:
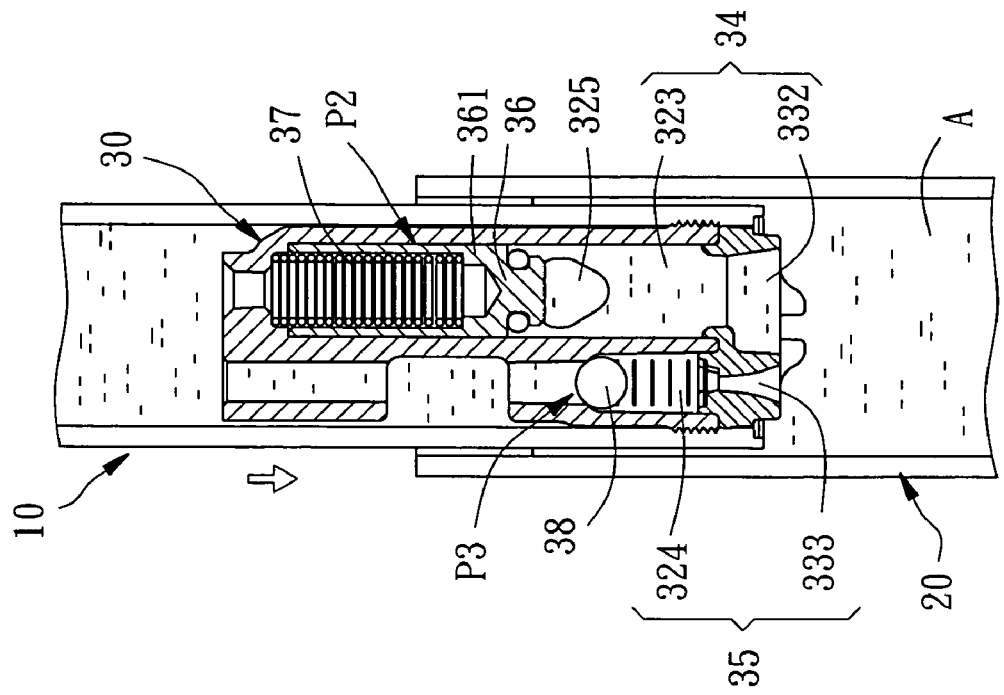
FIG. 10 is similar to FIG. 3 but showing the upper front fork tube moved downwards relative to the lower front fork tube.

As shown in FIGS. 4 and 9, the bottom block 33 is a flat member having two side flanges 331 radially protruded from the periphery at two sides, an inlet through hole 332 axially extended through the top and bottom sides, an outlet through hole 333 axially extending through the top and bottom sides, a first shoulder 334 extended around the top end of the inlet through hole 332, and a second shoulder 335 extended around the top end of the outlet through hole 333. The outlet through hole 333 is a tapered through hole having a diameter made gradually increased from the top side of the bottom block 33 toward the bottom side. The largest bottom end of the outlet through hole 333 is smaller than the inlet through hole 332. During installation, the side flanges 331 of the bottom block 33 are engaged into the bottom notch 329 of the cylindrical casing 32 to stop the bottom block 33 from rotary motion relative to the cylindrical casing 32. As shown in FIG. 3, when installation, a retaining ring 336 is fastened to the periphery of the bottom block 33 and engaged into the inside annular groove 11 to secure the bottom block 33 to the inside wall of the upper front fork tube 10 firmly. As shown in FIG 10, at this time, the inlet through hole 332 of the bottom block 33 is axially connected to the first axial hole 323 of the cylindrical casing 32 and forms with the first axial hole 323 a fluid inlet 34 for guiding upward movement of the fluid A from the lower front fork tube 20 to the upper front fork tube 10, and the outlet through hole 333 of the bottom block 33 is axially connected to the second axial hole 324 of the cylindrical casing 32 and forms with the second axial hole 324 a fluid outlet 35 for guiding downward movement of the fluid A from the upper front fork tube 10 to the lower front fork tube 20.

The blocking member 36 comprises a cylindrical body 361 axially movably mounted in the first axial hole 323 of the cylindrical casing 32, a blocking head 363 axially extended from the bottom side of the cylindrical body 361, and a seal ring 364 fastened to the periphery of the blocking head 363. The cylindrical body 361 has an open chamber 362 extended to the top side. The first spring member 37 is mounted in the first axial hole 323, having one end stopped at the first shoulder 326 of the cylindrical casing 32 and the other end inserted into the open chamber 362 and stopped at a part inside the cylindrical body 361. The first spring member 37 imparts a downward pressure to the blocking member 36 to force the blocking head 363 and the seal ring 364 against the first shoulder 334 of the bottom block 33.

The ball 38 and the second spring member 39 are mounted in the second axial hole 324 of the cylindrical casing 32. The second spring member 39 has one end stopped against the second shoulder 335 of the bottom block 33 and the other end stopped at the ball 38 against the second shoulder 327 of the cylindrical casing 32.

The operation of the damper 30 is outlined hereinafter.

FIG. 3 shows the standing status where the upper front fork tube 10 and the lower front fork tube 20 are not moved relative to each other. At this time, the first spring member 37 supports the blocking member 36 in the first position P1, i.e., the blocking head 363 and the seal ring 364 are stopped at the first shoulder 334 of the bottom block 33 and the cylindrical body 361 of the blocking member 36 blocks the through holes 325, and the second spring member 39 pushes the ball 38 against the second shoulder 327 of the cylindrical casing 32 and holds the ball 38 in the third position P3. Therefore, the blocking member 36 and the ball 38 respectively block the fluid inlet 34 and the fluid outlet 35, prohibiting upward flowing of the fluid A from the lower front fork tube 20 to the upper front fork tube 10.

Referring to FIG. 10, when the upper front fork tube 10 is moving downwards relative to the lower front fork tube 20 during running of the bicycle, the fluid A below the damper 30 is forced to move the blocking member 36 upwards to a second position P2 to compress the first spring member 37. During upward movement of the blocking member 36, the cylindrical body 361 is gradually moved away from the through holes 325, for enabling the fluid A to pass through the through holes 325. At this time, the ball 38 is still in the third position P3.

Figure 11:
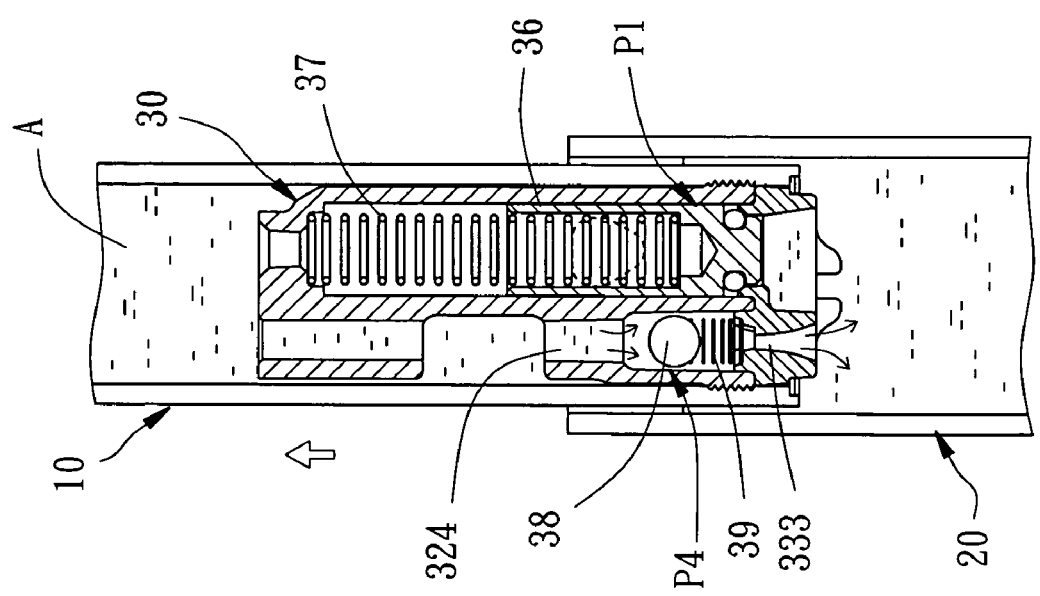
FIG. 11 is similar to FIG. 10 but showing the upper front fork tube moved upwards relative to the lower front fork tube.

Referring to FIG. 11, when the upper front fork tube 10 is moving upwards relative to the lower front fork tube 20, the fluid A above the damper 30 flows downwards through the second axial hole 324 to push the ball 38 to a fourth position P4 and to further compress the second spring member 39, for enabling the fluid A to pass through the outlet through hole 333 to the bottom side of the damper 30, i.e. the inside of the lower front fork tube 20. After that, the first spring member 37 is released to push the blocking member 36 back to the first position P1.

As indicated above, during down stroke as shown in FIG. 10 of the upper front fork 10 relative to the lower front fork, the flow rate of the fluid A passing through the through holes 325 is gradually increased subject to the movement of the blocking member 36, achieving a smooth buffering effect. Further, because the outlet through hole 333 has a diameter made gradually increased from the top side of the bottom block 33 toward the bottom side, it guides the fluid A to spread during downward flowing of the fluid A, reducing the production of noise. Because the damper has a simple structure, it is easy to manufacture and to install.

Figure 12:
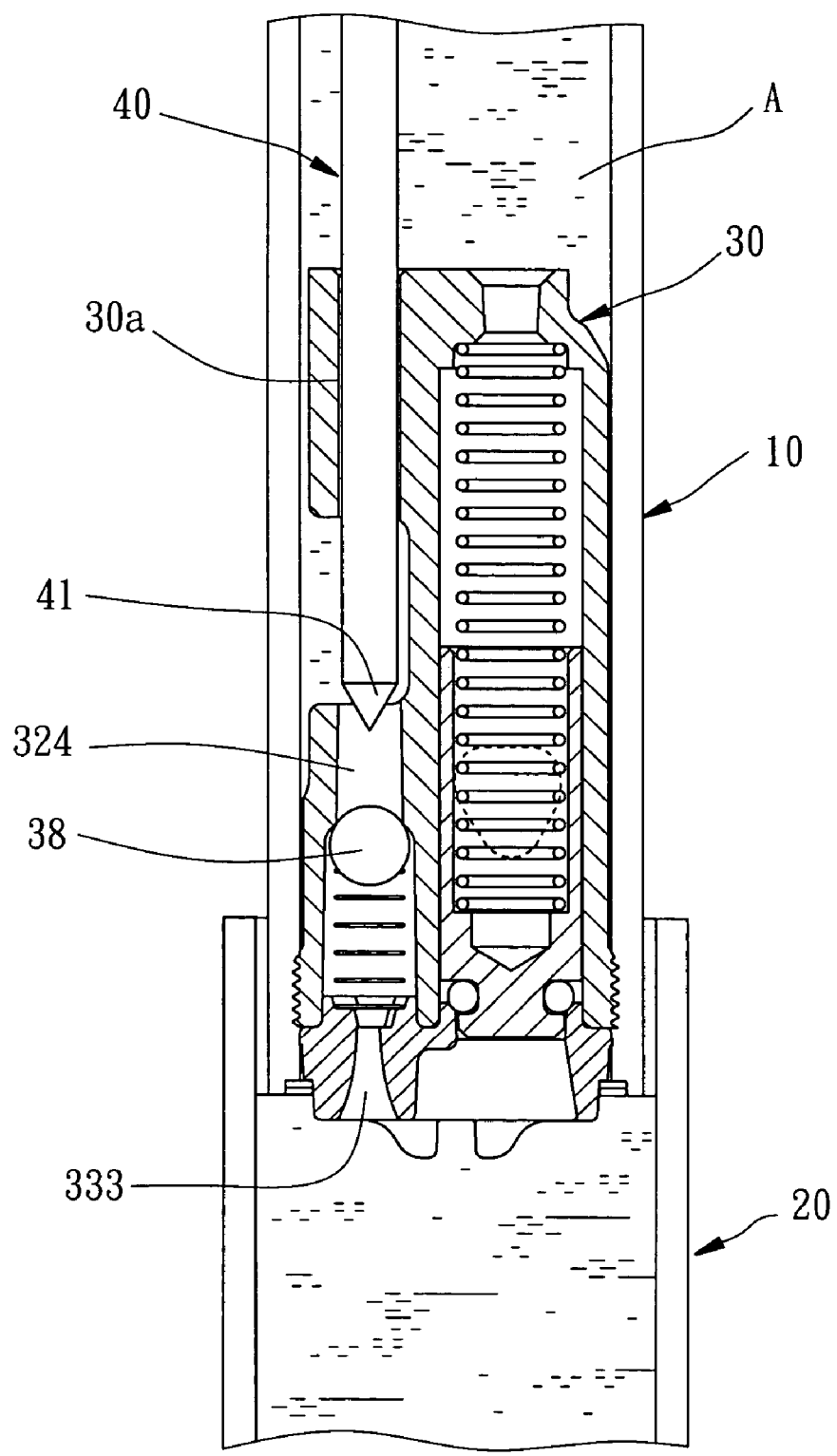
FIG. 12 is similar to FIG. 3 but showing a needle valve installed in the damper.

Referring to FIG. 12, a needle valve 40 may be selectively used in the damper 30. As illustrated, the needle valve 40 has a front end 41 inserted through an axially extended through hole 30a of the upper part of the damper 30 and approaching the top orifice of the second axial hole 324. The needle valve 40 can be controlled to adjust the distance between the front end 41 of the needle valve 40 and the top orifice of the second axial hole 324, so as to further control the return flow rate of the fluid A. Because the needle valve 40 does not directly receive upward impact pressure from the fluid A, it is durable in use. During upward and downward flowing of the fluid A, the needle valve 40 can be controlled to regulate the flow rate of the fluid A, achieving damping resistance control.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A front fork for a vehicle, comprising:
   an upper front fork tube;
   a lower front fork tube axially movably coupled to said upper front fork tube for containing a fluid therein; and
   a damper immersed in the fluid;
   wherein said damper comprises:
   a cylindrical main body fixedly fastened to a bottom side inside said upper front fork tube, said main body having a fluid inlet and a fluid outlet axially extended therethrough, and at least one through hole in communication between said fluid inlet and an outside of said cylindrical main body;
   a blocking member mounted in the fluid inlet of said cylindrical main body and movable between a first position where said blocking member stops said fluid from flowing upwards through said fluid inlet to above said cylindrical main body, and a second position where said fluid is allowed to pass from below said cylindrical main body to above said cylindrical main body through said at least one through hole and said fluid inlet, said blocking member being movable through a range of intermediate positions between said first and second positions wherein passage of said fluid through said at least one through hole and said fluid inlet is at least partially restricted by said blocking member; and
   a first spring member mounted in said fluid inlet for holding said blocking member in the first position;
   wherein said damper further comprises a sealing member mounted in said fluid outlet and movable in said fluid outlet between a third position where said sealing member prohibits said fluid to flow upwards through said fluid outlet from below said cylindrical main body to above said cylindrical main body, and a fourth position where said fluid flows downwards from above said cylindrical main body to below said cylindrical main body through said fluid outlet;
   wherein said damper further comprises a second spring member mounted in said fluid outlet for holding said sealing member in said third position;
   wherein said cylindrical main body comprises a narrow upper part and a broad lower part, the broad lower part being peripherally sealedly fastened to the bottom side inside said upper front fork tube; wherein the at least one through hole is transversely extended through said narrow upper part and communicated with said fluid inlet;
   wherein said cylindrical main body comprises a cylindrical casing and a bottom block coupled to said cylindrical casing; wherein said cylindrical casing has a first axial hole and a second axial hole arranged in parallel, and said bottom block has an inlet through hole and an outlet through hole, the inlet through hole of said bottom block forming with the first axial hole of said cylindrical casing said fluid inlet, the outlet through hole of said bottom block forming with the second axial hole of said cylindrical casing said fluid outlet;
   wherein the outlet through hole of said bottom block has a diameter made gradually increased from a top side of said bottom block toward a bottom side of said bottom block;
   wherein said cylindrical casing comprises a first shoulder extended around a top end of the first axial hole, and a second shoulder extended around a top end of said second axial hole for supporting said sealing member in said third position; said bottom block comprises a first shoulder extended around a top end of the inlet through hole of said bottom block for supporting said blocking member in said first position, and a second should extended around a top end of the outlet through hole of said bottom block; and
   wherein said blocking member comprises a cylindrical body, which has an outer diameter fitting said first axial hole of said cylindrical main body, and a blocking head axially downwardly extended from a bottom side of said cylindrical body; said first spring member is a coil spring stopped between the first shoulder of said cylindrical casing and said cylindrical body of said blocking member to force said blocking head against the first shoulder of said bottom block; said sealing member is a ball; said second spring member is coil spring stopped between the second shoulder of said bottom block and a bottom side of said ball to force said ball against the second shoulder of said cylindrical casing.

* * * * *